(12) United States Patent
Chawgo

(10) Patent No.: US 7,497,002 B2
(45) Date of Patent: Mar. 3, 2009

(54) COAXIAL CABLE STRIPPING TOOL WITH MARKING DEVICE

(75) Inventor: Shawn Chawgo, Cicero, NY (US)

(73) Assignee: John Mezzalingua Associates, Inc., East Syracuse, NY (US)

( * ) Notice: Subject to any disclaimer, the term of this patent is extended or adjusted under 35 U.S.C. 154(b) by 269 days.

(21) Appl. No.: 11/419,039

(22) Filed: May 18, 2006

(65) Prior Publication Data

US 2007/0266566 A1    Nov. 22, 2007

(51) Int. Cl.
    *B23Q 41/00* (2006.01)
(52) U.S. Cl. ........................... 29/564.4; 81/9.41
(58) Field of Classification Search ............ 29/564.4; 30/90.1, 90.4, 90.6, 90.7, 90.8, 91.2, 116; 81/9.4, 9.41, 9.42, 9.43; 33/332, 34
    See application file for complete search history.

(56) References Cited

U.S. PATENT DOCUMENTS

| | | | |
|---|---|---|---|
| 3,196,780 A * | 7/1965 | Ternovits et al. ............ 101/10 |
| 3,486,216 A * | 12/1969 | Cimolino ..................... 81/9.41 |
| 3,769,705 A * | 11/1973 | Biddle ......................... 30/90.1 |
| 4,451,948 A * | 6/1984 | Goodrich et al. ............. 30/91.2 |
| 4,465,717 A | 8/1984 | Crofts et al. |
| 4,641,428 A * | 2/1987 | Anderson ................... 29/564.4 |
| 5,063,795 A * | 11/1991 | Krampe ....................... 81/9.43 |
| 5,190,384 A * | 3/1993 | Speicher ..................... 400/128 |
| 5,412,856 A | 5/1995 | Nazerian et al. |
| 5,992,038 A | 11/1999 | Harmon et al. |
| 6,574,881 B2 | 6/2003 | Cole, III |
| 6,582,142 B2 | 6/2003 | Keller et al. |
| 6,725,560 B2 | 4/2004 | Smith |
| 6,910,256 B2 * | 6/2005 | Locher et al. ............... 29/564.4 |
| 7,103,968 B2 * | 9/2006 | Karrasch .................... 29/564.4 |
| 7,171,738 B2 * | 2/2007 | Dick et al. .................... 29/563 |
| 2005/0178019 A1 | 8/2005 | Scarborough |
| 2006/0179662 A1 * | 8/2006 | Holliday et al. .............. 30/90.1 |

FOREIGN PATENT DOCUMENTS

WO    02073635    9/2002

* cited by examiner

*Primary Examiner*—Dana Ross
(74) *Attorney, Agent, or Firm*—Christopher R. Pastel; Pastel Law Firm

(57) ABSTRACT

A cable stripping tool includes a marking device connected directly to a handle of the tool, or connected to a cartridge containing the marking device, which cartridge is connected to the handle of the tool. The underside of the cartridge contains a plurality of cutting blades to cut different layers of a coaxial cable. The marking device contains a tip which marks the proper location on the cable indicating the proper depth of insertion of the prepared coaxial cable into a cable connector. Different cartridges are sized to mark and cut different sizes of cable.

11 Claims, 2 Drawing Sheets

COAXIAL CABLE STRIPPING TOOL WITH MARKING DEVICE

FIELD OF THE INVENTION

This invention relates generally to the field of coaxial cable stripping tools, and more particularly to a coaxial cable stripping tool having a marking device incorporated therein.

BACKGROUND OF THE INVENTION

At present, installation of some coaxial cable connectors requires marking of the cable jacket prior to installation to ensure proper insertion depth of the cable within the cable connector. A common marking practice is to align the end of the prepared cable with a mark on the connector and mark the jacket at the rear of the connector using a thumbnail, screwdriver, or other non-damaging instrument. This method of marking depends greatly on the care and skill of the installer to ensure the mark is placed in its proper location.

SUMMARY OF THE INVENTION

Briefly stated, a cable stripping tool includes a marking device connected directly to a handle of the tool, or connected to a cartridge containing the marking device, which cartridge is connected to the handle of the tool. The underside of the cartridge contains a plurality of cutting blades to cut different layers of a coaxial cable. The marking device contains a tip which marks the proper location on the cable indicating the proper depth of insertion of the prepared coaxial cable into a cable connector. Different cartridges are sized to mark and cut different sizes of cable.

According to an embodiment of the invention, a cable stripping tool for preparing a coaxial cable for insertion into a cable connector includes a handle; and a marking device at one end of the handle; wherein the marking device includes a tip for leaving a mark on a coaxial cable surface, wherein the mark indicates a proper location on the cable surface indicating a proper depth of insertion of the prepared coaxial cable into the cable connector.

According to an embodiment of the invention, a method for making a cable stripping tool to prepare a coaxial cable for insertion into a cable connector includes the steps of providing a handle; removably connecting a marking device at one end of the handle; and providing a tip in the marking device for leaving a mark on a coaxial cable surface, wherein the mark indicates a proper location on the cable surface indicating a proper depth of insertion of the prepared coaxial cable into the cable connector.

According to an embodiment of the invention, a method for using a cable stripping tool to prepare a coaxial cable for insertion into a coaxial cable connector includes the steps of connecting a marking device to a handle of the stripping tool; aligning the stripping tool on an end of the coaxial cable; and marking a proper location on a surface of the cable indicating a proper depth of insertion of the prepared coaxial cable into the cable connector.

DETAILED DESCRIPTION OF THE PREFERRED EMBODIMENT

Figure 1:
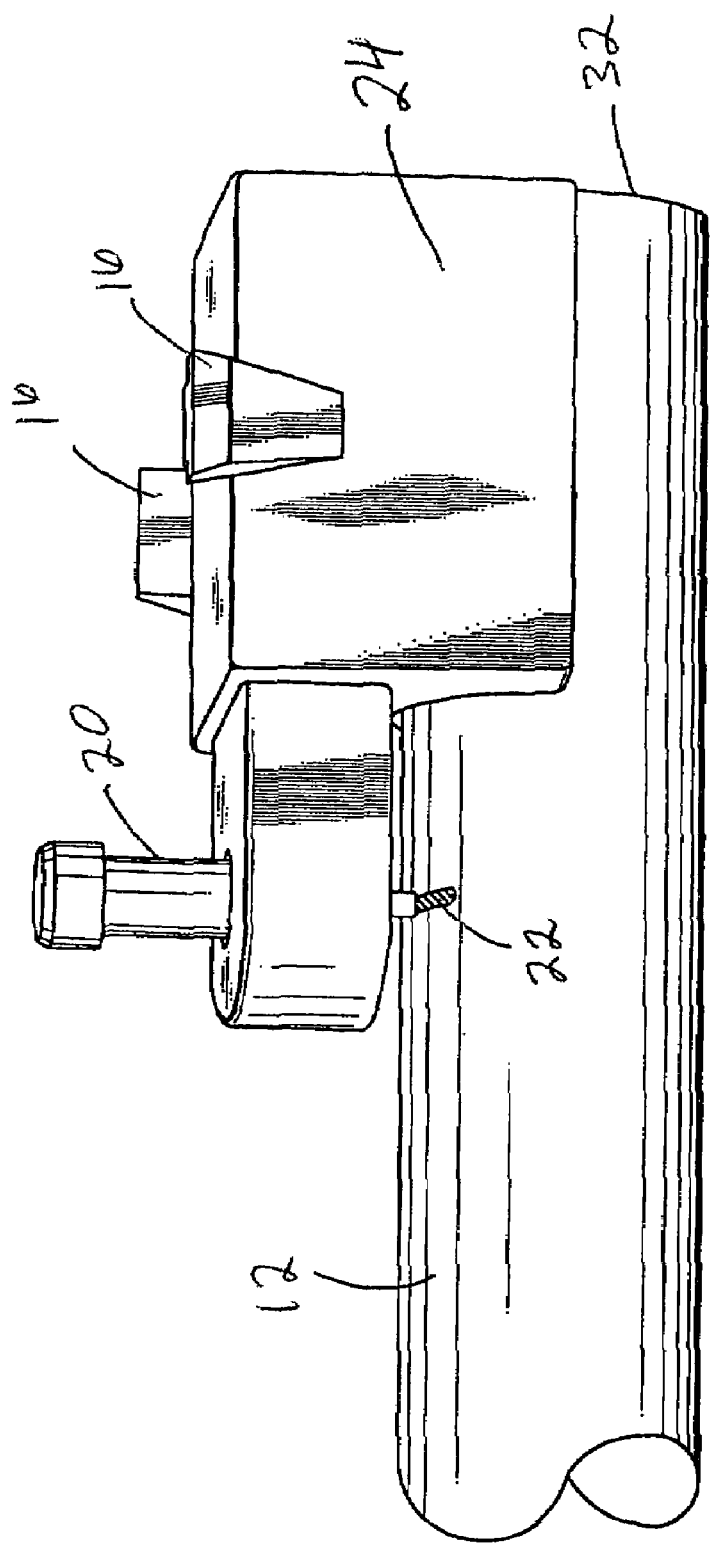
FIG. 1 shows a cartridge and marker of a cable stripping tool according to an embodiment of the invention.
Figure 2:
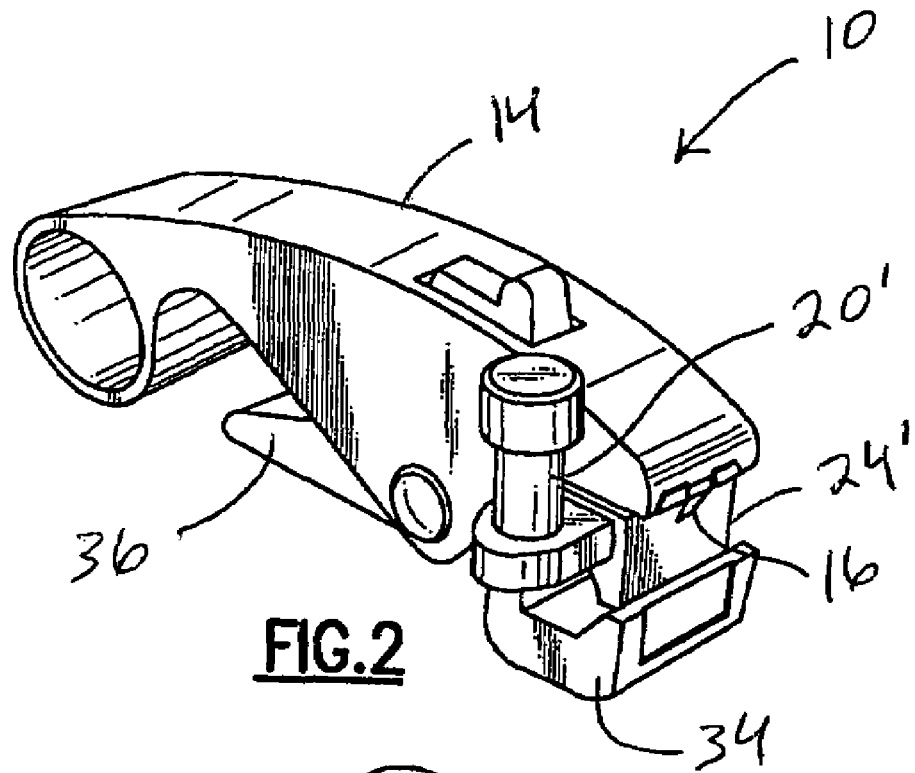
FIG. 2 shows a perspective view of a cable stripping tool according to an embodiment of the invention.

Referring to FIG. 1, a marker 20 is shown inserted into a replaceable cartridge 24. Marker 20 can also be removably connected to a handle 14. Marker 20 is preferably a pen, grease pencil, or other similar marking implement. Cartridge 24 is shown placed along a coaxial cable 12. A plurality of cartridges 24 are preferably available to mark properly different cable sizes. Cartridge 24 preferably includes a plurality of clamps 16 to permit attaching cartridge 24 to cable stripping tool handle 14 (FIG. 2). Cable 12 has been cut at an end 32 and is ready for stripping to prepare cable 12 for insertion into a coaxial cable connector. A tip 22 of marker 20 preferably applies an ink coating or a color stripe similar to white-out pressure sensitive correction tape.

Figure 3:
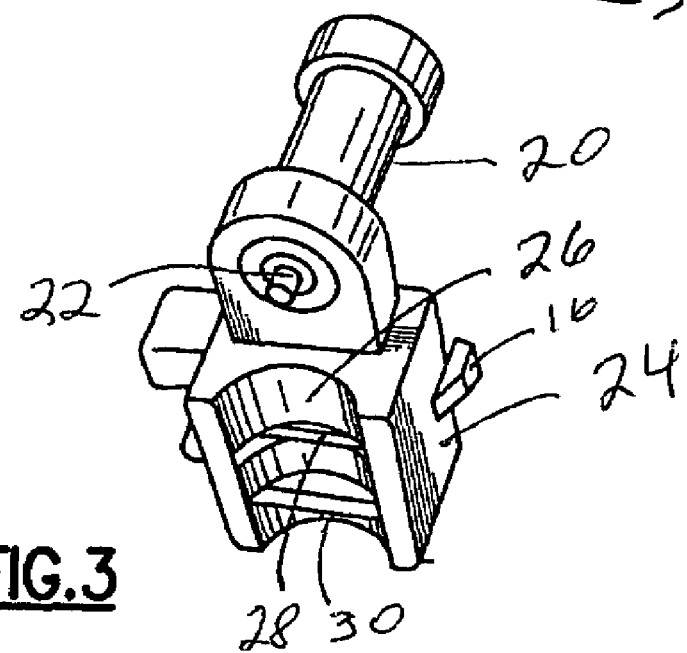
FIG. 3 shows a perspective view of a cartridge and marker of a cable stripping tool according to the embodiment of FIG. 1.

Referring to FIG. 3, a curved portion 26 of cartridge 24 preferably includes a cutting blade 28 for cutting through the cable jacket of cable 12, and a cutting blade 30 for cutting through the cable to expose the center conductor of cable 12. With these parts of cable 12 properly cut, and the properly spaced mark left on cable 12 by tip 22, end 32 of cable 12 is ready for insertion into the coaxial cable connector.

Referring to FIG. 2, cartridge 24 shown connected to handle 14 of a cable stripping tool 10. Tool 10 also preferably includes a cable holder 34 which supports the side of cable 12 (FIG. 1) opposite cutting blades 28, 30. Pressing lever 36 towards the main part of tool 10 forces cutting blades 28, 30 against cable 12. As tool 10 is moved in a circular motion around cable 12, cutting blades 28, 30 cut into the proper layers of cable 12 while tip 22 draws a mark around cable 12 indicating the proper depth of insertion of the prepared coaxial cable into the cable connector (not shown).

While the present invention has been described with reference to a particular preferred embodiment and the accompanying drawings, it will be understood by those skilled in the art that the invention is not limited to the preferred embodiment and that various modifications and the like could be made thereto without departing from the scope of the invention as defined in the following claims.

What is claimed is:

1. A cable stripping tool for preparing a coaxial cable for insertion into a cable connector, comprising:
a handle; and
a marking device disposed at one end of the handle;
a cartridge removably connectable at the end of the handle;
an underside of the cartridge holding at least one cutting blade of a predetermined cutting length;
the marking device being connected to the handle via the cartridge;
wherein the marking device includes a tip for leaving a mark on a coaxial cable surface, wherein the mark indicates a proper location on the cable surface indicating a proper depth of insertion of the prepared coaxial cable into the cable connector.

2. A tool according to claim 1, wherein the cartridge includes a plurality of clamps which connect the cartridge to the handle.

3. A tool according to claim 2, wherein the underside of the cartridge is curved to accommodate a particular size of cable.

4. A tool according to claim 3, wherein the tool accepts cartridges which are tailored to accommodate, mark, and cut different sizes of cable.

5. A tool according to claim 4, further comprising:
a lever pivotally connected to the tool handle; and a cable holder operatively connected to the lever, wherein moving the lever closer to the handle causes the cable holder to move towards the cartridge.

6. A method for making a cable stripping too to prepare a coaxial cable for insertion into a cable connector, comprising the steps of:
   providing a handle;
   removably connecting a marking device at one end of the handle;
   providing a tip in the marking device for leaving a mark on a coaxial cable surface, wherein the mark indicates a proper location on the cable surface indicating a proper depth of insertion of the prepared coaxial cable into the cable connector;
   removably connecting a cartridge at the end of the handle;
   forming an underside of the cartridge to hold at least one cutting blade of a predetermined cutting lengths; and
   connecting the marking device to the handle via the cartridge.

7. A method according to claim 6, wherein the cartridge includes a plurality of clamps which connect the cartridge to the handle.

8. A method according to claim 7, wherein the underside of the cartridge is curved to accommodate a particular size of cable.

9. A method according to claim 8, wherein the tool accepts cartridges which are tailored to accommodate, mark, and cut different sizes of cable.

10. A method according to claim 9, further comprising the steps of:
    pivotally connecting a lever to the tool handle; and
    operatively connecting a cable holder to the lever, wherein moving the lever closer to the handle causes the cable holder to move towards the cartridge.

11. A method for using a cable stripping tool to prepare a coaxial cable for insertion into a coaxial cable connector, wherein the stripping tool includes a removable cartridge having the marking device attached to the handle via the cartridge, and an underside of the cartridge includes first and second cutting blades of first and second cutting lengths, respectively, the method comprising the steps of:
    connecting a marking device to a handle of the stripping tool;
    aligning the stripping tool on an end of the coaxial cable;
    marking a proper location on a surface of the cable indicating a proper depth of insertion of the prepared coaxial cable into the cable connector;
    choosing a cartridge to accommodate a particular size of coaxial cable;
    connecting the cartridge to a handle of the stripping tool;
    aligning the stripping tool on an end of the coaxial cable; and
    moving the stripping tool in a circular motion around the coaxial cable such that the first cutting blade cuts through an outer sheath of the coaxial cable, the second cutting blade cuts through a dielectric layer of the coaxial cable, and the marker marks proper location on a surface of the cable indicating a proper depth of insertion of the prepared coaxial cable into the cable connector.

* * * * *